United States Patent Office 3,338,233
Patented Aug. 29, 1967

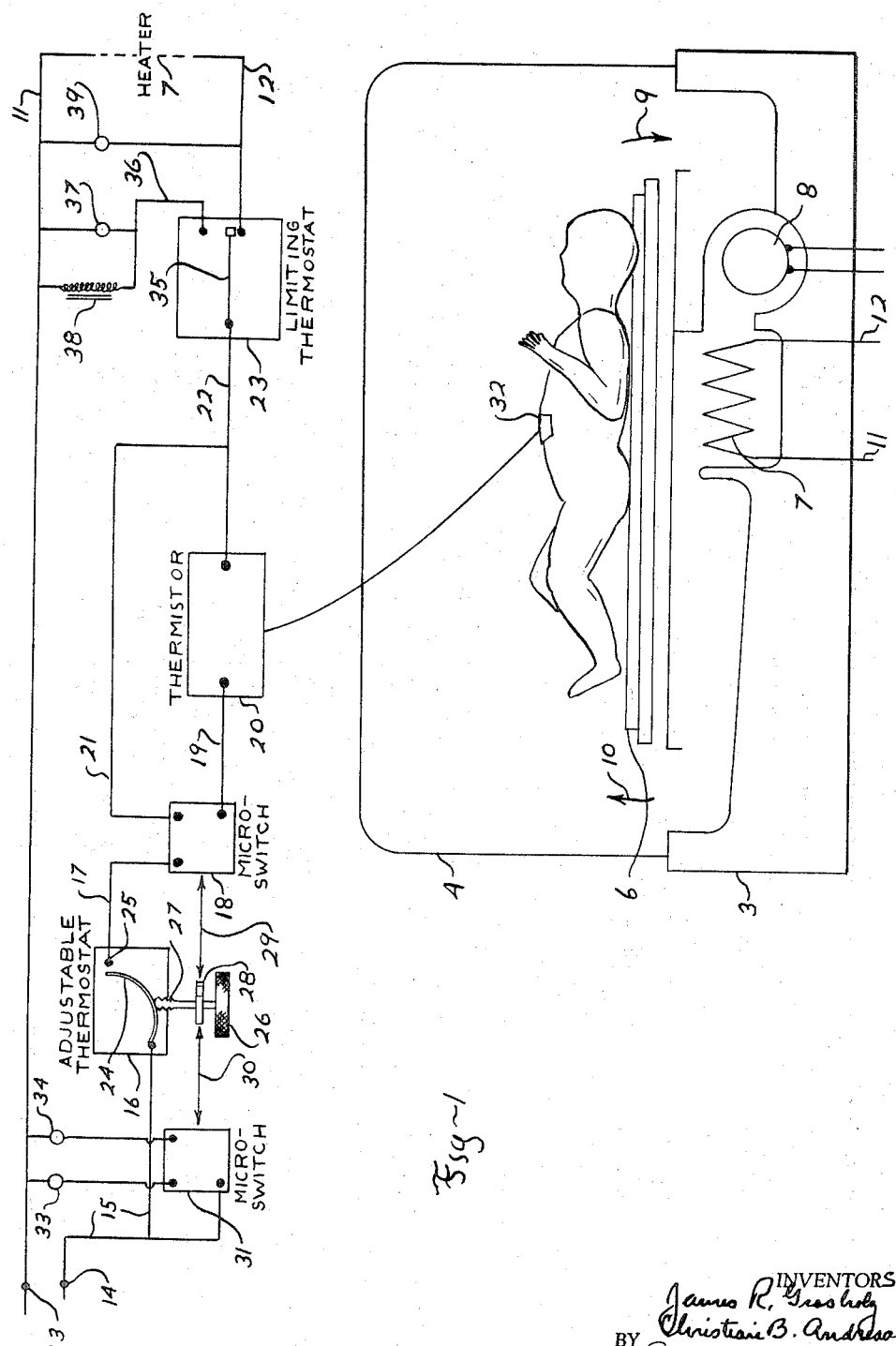

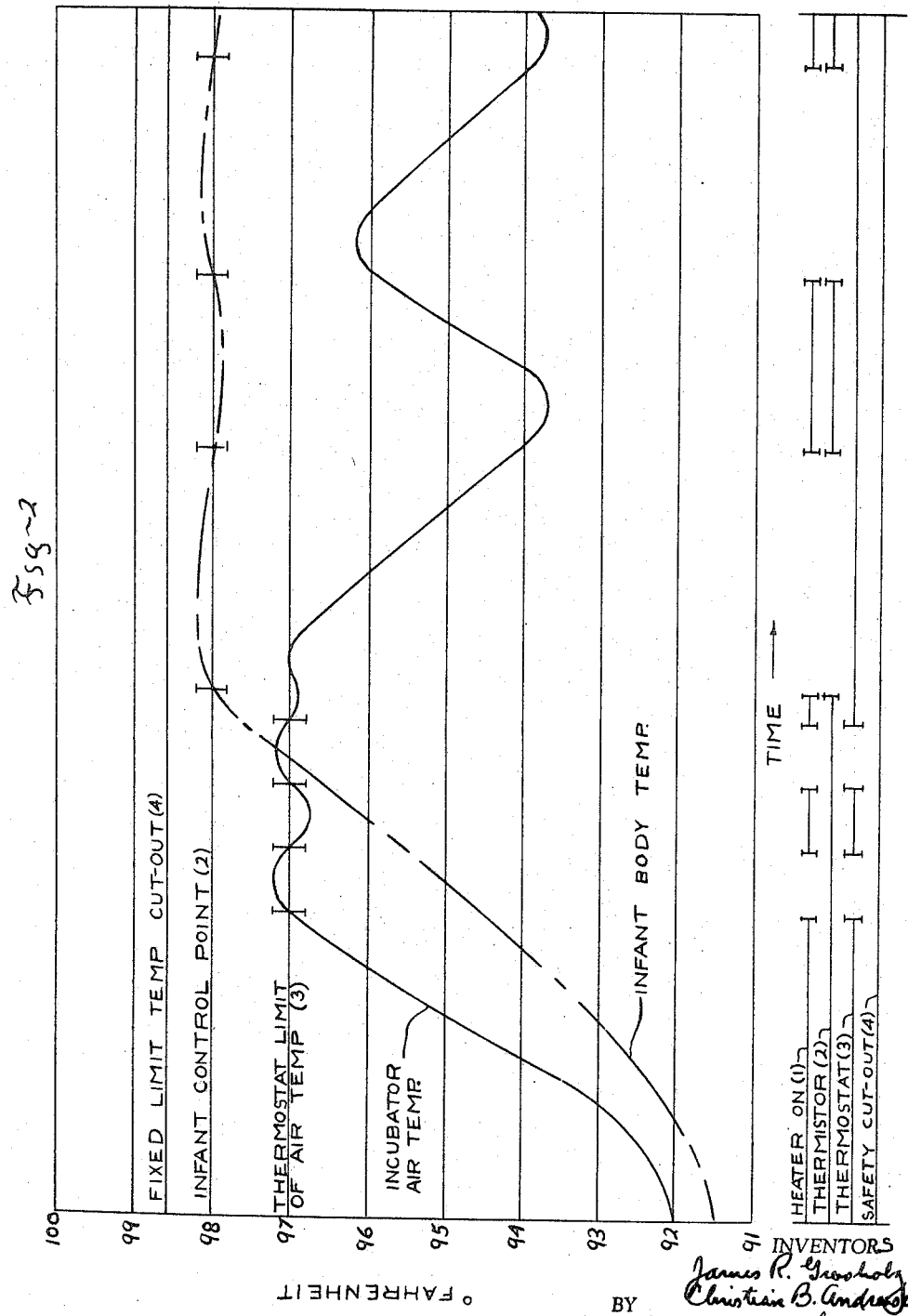

3,338,233
INCUBATOR TEMPERATURE CONTROL SYSTEM AND METHOD OF OPERATION
James R. Grosholz, Strafford, and Christian B. Andreasen, New Hope, Pa., assignors to Air-Shields, Inc., Hatboro, Pa., a corporation of Delaware
Continuation of application Ser. No. 353,153, Mar. 19, 1964. This application Dec. 28, 1966, Ser. No. 605,274
12 Claims. (Cl. 128—1)

ABSTRACT OF THE DISCLOSURE

Incubator heater control system having thermostat for limiting incubator air temperature and for giving overheat warning signal, having control device responsive to the temperature of the occupant for regulating the heater, and having a thermostat for cycling the heater during warm-up without activating the warning signal; also method for operation of the control system.

---

This application is a continuation of my copending application Ser. No. 353,153 filed Mar. 19, 1964, and now abandoned.

This invention relates to incubators, particularly infant incubators, and the invention is especially concerned with a control system for such incubators providing for regulation of the temperature of the infant in the incubator, and also to a method for operating the control system.

Stated generally, it is the object of the present invention to provide an improved control system for regulating the air temperature within the incubator and thus the body temperature of the infant in the incubator.

It is also an object of the invention to provide a control system and method of operation incorporating safety provisions providing for proper temperature regulation not only during prolonged occupancy of the incubator, but also during the initial warm-up period of an infant introduced into the incubator at a subnormal temperature.

Still further, the invention contemplates a control system providing alternatively for regulation of the air temperature within the incubator either by a thermistor responsive to the body temperature of the infant or by an adjustable thermostat responsive to the air temperature within the incubator.

Other objects and advantages will appear more fully from the following description referring to the accompanying drawings in which:

FIGURE 1 is a diagrammatic illustration of an incubator, with an infant therein, and with an associated control circuit for the heater element of the incubator; and FIGURE 2 is a graph illustrating representative conditions of operation of the incubator and control system shown in FIGURE 1.

Referring first to FIGURE 1, in the lower portion of that figure there is diagrammatically indicated an incubator comprising a base 3 and a cover or hood 4 ordinarily composed of transparent material and ordinarily having a hinge so as to be capable of being lifted for insertion and removal of an infant or alternatively provided with a door for that purpose.

A mattress or support for the infant in the incubator is indicated at 6, and below this support there is provided a heater arrangement including an electric heating element diagrammatically indicated at 7 and an air circulating blower indicated at 8 arranged to receive air from the hood enclosure as indicated by the arrow 9 at the right of FIGURE 1 and further arranged to circulate air over the heater element 7 and thence back into the hood enclosure as indicated by the arrow 10 at the left of the figure. The details of construction of the incubator need not be considered herein as they form no part of the present invention per se. An arrangement of this kind is disclosed in the copending application of Grosholz and Wallace, Ser. No. 321,491, filed Nov. 5, 1963, and assigned to the assignee of the present application.

The present application is especially concerned with a control system for the heater means of an incubator, for instance, for the heater element diagrammatically indicated at 7 in FIGURE 1. That heater element is adapted to be supplied with heating current through the connections 11 and 12 which appear at the bottom of FIGURE 1 and which also appear at the extreme right of the circuit diagram in the upper portion of FIGURE 1. As shown in the circuit diagram of FIGURE 1, the connection 11 extends to the terminal 13 at the left side of the figure, this terminal, together with the terminal shown at 14, indicating a source of supply of heater current, for instance the standard 110 volt supply line. Terminal 14 is connected by means of conductor 15 with one side of the adjustable thermostat 16, the other side of which is connected by wire 17 with a microswitch 18, providing for alternative connection of the supply line either with the conductor 19 extended to the thermistor 20 or with the by-pass 21 extended around the thermistor 20 or with the by-pass 21 extended around the thermistor 20. The circuit further includes the conductor 22 by which the thermistor and the by-pass 21 are connected with one side of the limiting or cut-off thermostat 23, one output terminal of which is connected with the conductor 12 which is extended to the heater element 7.

The adjustable thermostat 16 includes a bimetal or similar thermally responsive element 24 adapted to make and break a circuit by cooperation with the terminal or contact diagrammatically indicated at 25. This unit is adjustable by means of the hand knob 26 which is threaded as at 27 to thereby influence the temperature at which the element 24 will make or break the circuit. The details of construction of this adjustable thermostat need not be considered herein, particularly since any of a number of well-known adjustable thermostats may be employed. It is mentioned, however, that this thermostat, according to the invention, is arranged to be subject to the air temperature in the incubator, so that the heater circuit will be broken when the air temperature rises above a certain value and will be closed when the air temperature drops below that value. The adjustable knob 26 provides for changing the value at which the heater circuit will be opened and closed, in a manner well understood with equipment of this sort.

The shaft of the knob 26 also carries a cam device 28 with which cam followers diagrammatically indicated at 29 and 30 are associated, the follower 29 serving to actuate the microswitch 18 and the follower 30 being adapted to actuate the microswitch 31 which is provided for purposes described hereinafter.

Microswitch 18 serves to alternatively connect the conductor 17 either with the conductor 19 or the by-pass 21, and the cam 28 is arranged so that when the adjustable knob 26 is rotated to the position corresponding to the maximum temperature setting of the adjustable thermostat 16, the connection 17 is coupled with connection 19 and is disconnected from the by-pass 21, thereby introducing the thermistor 20 into the circuit. In the preferred embodiment it is contemplated that whenever the knob 26 is adjusted to a position below the maximum temperature setting, the connection 17 will be coupled with the by-pass 21, thereby disabling the thermistor 20. The thermistor 20 includes a probe such as diagrammatically indicated at 32, adapted to be attached to the body of the infant and responsive to the infant's temperature to regulate the resistance in the heater circuit, and thus provide for control of the heater. Thermistors of this type are well known and are capable of very substantial controlling effects, even with very slight variation of temperature from the control temperature.

The actuating connection 30 which is operated by cam 28 serves to alternatively operate the microswitch 31 so as to connect one or the other of the signal lamps 33 and 34 with the current supply conductor 15. This microswitch 31 thus serves to indicate whether the knob 26 is in the maximum temperature setting (at which time the thermistor 20 is in the circuit) or whether the knob 26 is adjusted to a lower temperature setting (at which time the thermistor 20 is by-passed through the connection 21).

The limiting or cut-off thermostat 23 is provided with a thermally responsive element 35 also exposed to the temperature of the air in the incubator and arranged to break the connection with the conductor 12 leading to a heater when the temperature rises above a certain fixed predetermined limit. This limit may be made factory adjustable if desired but in the preferred embodiment is not intended to be variable in the ordinary use of the equipment. When the air temperature rises above the limit, the element 35 also moves to complete a circuit 36 preferably having therein both a red or danger signal lamp 37, as well as a buzzer or other audible signal 38.

The signal lamp 39 which is arranged in parallel with the heater element 7 between the conductors 11 and 12 will be lighted whenever the heater is active.

The operation of the control system will be explained in relation to the graph of FIGURE 2, as will also certain relative settings of the thermostats 16 and 23 and of the thermistor 20.

In the graph, the vertical axis is marked with numerical values running from 91 to 100, these values representing temperatures in degrees Fahrenheit. The horizontal axis represents time, and no individual units are indicated, because the specific time values are not involved in the features of the invention depicted.

It is pointed out that the line at about 98.6° which is marked "Fixed Limit Temp. Cut Out" represents the air temperatures in the incubator at which the limiting thermostat 23 operates to break the heater circuit.

The line at 97° marked "Thermostat Limit of Air Temp." represents the maximum air temperature limit at which the adjustable thermostat 16 may be set by actuation of the control knob 26 thereby providing for opening and closing of the heater circuit when the air temperature rises above and falls below this maximum setting.

The line at 98° marked "Infant Control Point" represents the body temperature of the infant occupying the incubator at which the thermistor 20 operates to decrease and increase the heater current.

As indicated the graph contains two curves, one representing the body temperature of an infant and another the incubator air temperature. To follow through a typical or representative operation using the control system of the invention, it is assumed first that the adjustable thermostat 16 is set at its maximum limit, representing a control point at 97° as shown in FIGURE 2. It is further assumed that an infant is placed in the incubator at a body temperature of 91.5° F. which is the point of origin of the curve for the body temperature shown in FIGURE 2. Since the incubator must be opened in order to insert the infant, the air temperature in the incubator will of course be somewhat lower than that normally maintained in the incubator. As a representative example, this air temperature at the time the infant is placed in the incubator is indicated in the graph of FIGURE 2 as being 92° F. From this initial temperature, the temperature of the air rises fairly sharply as a result of operation of the heater 7 until the air temperatures reaches 97° F. at which time the thermostat 16 will open, and will reclose when the air temperature again falls below the 97° set limit, and so forth.

During the initial period of warm-up for the infant the body temperature will rise, in a typical case more slowly than the air temperature, and upon attaining the control temperature established by the thermistor 20 (98° F.), the infant's body temperature will then exercise control and will diminish the heating current delivered to the heater element 7, until the body temperature again drops below 98° F. During the interval when the body temperature is above 98° F., the air temperature will continue to drop even below the 97° maximum setting of the adjustable thermostat notwithstanding the fact that the adjustable thermostat 16 is closed, the reason being because at that time the current flow through the thermistor is decreased. When the infant's body temperature drops below 98° F. the heating current is again increased, and the air temperature will again start to rise as is shown in the graph until the body temperature again rises above the 98° control point, and so forth.

During all of the time described above it will be noted that the fixed limit thermostat or cut out 23 remains closed, because the air temperature never reaches that limit. In the event, however, that the air temperature rises abnormally in the incubator, for instance in consequence of placement of the incubator in direct sunlight or too close to a source of external heating, when the cut out temperature is reached, the thermostat 23 will open and terminate the heating and will also activate warning signals including preferably a red light 37 and some audible signal such as a buzzer 38.

From the foregoing it will be seen that the circuit for the heater element 7 has incorporated therein three control devices in series including the manually adjustable thermostat 16, the thermistor 20 and the fixed limit thermostat 23. The heater element 7 will only receive effective heating current when all three of the control devices call for heat. Because of the series connection of these devices, when any one of them indicates that heat is not needed, effective heating current does not flow through the heater element 7. In this way a highly reliable safety feature is built into the control system, and at the same time no special warning or alarm signals are given, even under the special conditions which prevail upon initial infant warm-up in the incubator.

The lines appearing just below the graph of FIGURE 2 indicate certain conditions prevailing in the operation of the equipment in the typical case represented by the curves appearing in the graph of FIGURE 2. Thus the line marked "Safety Cut Out" is seen to be a continuous line throughout the length of the chart, thereby indicating that the fixed limit thermostat 23 remains closed throughout the entire operation depicted in the graph of FIGURE 2. The line marked "Thermostat" represents the times when the adjustable thermostat 16 is closed, and here it will be seen that two breaks appear, which correspond in time to the points when the air temperature in the incubator is above the 97° upper limit setting of the adjustable thermostat.

The line marked "Thermistor" represents the action of the thermistor 20 on the heater element and here it will be seen that the within the limits of the chart of FIGURE 2 two breaks occur in this line, representing times when the infant body temperature is above the infant control point of the thermistor 20.

The line marked "Heater On" indicates the intervals during which the heater element is being activated by effective current flow therethrough, and from this line it will be seen that a break occurs at any interval when a break appears in any of the other lines.

It will be understood that the settings or control points for any of the three control devices (16, 20 and 23) may be varied somewhat from the values indicated in FIGURE 2. However it has been found that a maximum air temperature in the incubator of 97° is about as high as is required under any normal conditions, in view of which this value is preferably selected for the maximum setting of the adjustable thermostat. An infant body temperature of about 98° is also considered a proper value, although a thermistor of some slightly different value or capable of manual adjustment may be employed.

Although for ordinary operation the air temperature need not rise above about 97°, air temperatures slightly higher than this are not considered harmful when the incubator is under normal attention. Thus a safety cut out temperature at about 98.6° or even 99° F. is satisfactorily used and when placed at such a value has the added advantage of avoiding unnecessary sounding of safety alarms even during initial warm-up periods, in which the air temperature ordinarily has a tendency to rise above that of the infant and to a value higher than that required after the infant reaches the desired body temperature or control point.

In addition to the advantages and features above referred to, the arrangement of the invention has the further advantage that it may be operated alternatively by regulation of the air temperature within the incubator directly and without influence by the body temperature of the infant. For this purpose, the control knob 26 is adjusted to a setting below the maximum temperature setting, in consequence of which the cam follower 29 actuates the microswitch 18 to connect the conductor 17 with the by-pass 21 around the thermistor 20. In this condition the thermistor no longer will exercise influence on the heater element 7, but the adjustable thermostat will still function for that purpose, and it is contemplated that the thermostat shall be capable of adjustment over an air temperature range, for example from about 97° down to about 75° F. When operating in this mode, the air temperature in the incubator is merely maintained at the adjusted value of the adjustable thermostat without regard to the infant's body temperature and there are circumstances and conditions of infants which make such alternative control desirable at least from time to time. The operator or attendant will always know in which mode of operation the incubator is set because of the signal lamps 33 and 34, which may be appropriately differently colored or differently marked, as will be understood by those skilled in the art. As mentioned above the signal lamps are controlled by the microswitch 31 actuated by the cam 30, one lamp being lighted when the knob 26 is at the maximum temperature position, and the other lamp being lighted at any point in the adjustment of the knob 26 below the maximum temperature setting.

The arrangement of the invention will be seen to provide for a wide range of operating conditions and further to provide for an automatic control responsive to body temperature while maintaining safeguards against excessive temperature in the incubator.

We claim:

1. A control system for the heater element for heating the air in an incubator, comprising a heater control circuit incorporating a limiting thermostat for controlling the heater and responsive to air temperature in the incubator to establish an air temperature limit in the incubator, a device responsive to the temperature of the occupant for controlling the heater, the heater, thermostat and device being connected in series in the circuit, an adjustable thermostat in the circuit operative to control the heater and responsive to the incubator air temperature and providing for adjustably limiting the air temperature to a range below the temperature limit provided by the limiting thermostat, and means operated by adjustment of the adjustable thermostat to disable the device responsive to the temperature of the occupant except when the adjustable thermostat is adjusted to a point toward the upper end of its temperature adjustment range.

2. A control system according to claim 1 in which the disabling means comprises a switch operated by adjustment of the adjustable thermostat to by-pass the said device except when the adjustable thermostat is adjusted to a point toward the upper end of is temperature adjustment range.

3. A control system for the heater element for heating the air in an incubator, comprising a heater control circuit incorporating a device responsive to the temperature of the occupant for controlling the heater, an adjustable thermostat in the circuit operative to control the heater and responsive to the incubator air temperature and providing for adjustably limiting the air temperature, and means operated by adjustment of the adjustable thermostat to disable the device responsive to the temperature of the occupant except when the adjustable thermostat is adjusted to a point toward the upper end of its temperature adjustment range.

4. A control system according to claim 1 and further including signal means operated by adjustment of the adjustable thermostat to indicate whether said device is active or disabled.

5. In an incubator having an air circulation system and a heater element for heating the air in the incubator, a control system for the heater element comprising a heater control circuit incorporating a limiting thermostat for controlling the heater element, the limiting thermostat being exposed to the air in the circulation system of the incubator and being responsive to air temperature to establish an air temperature limit in the incubator, a device responsive to the temperature of the occupant for controlling the heater, an adjustable device responsive to the incubator air temperature and providing for adjustably limiting the air temperature to a range below the temperature limit provided by the limiting thermostat, connectors providing for series connection of the limiting thermostat and said devices with the heater element, and switch means providing for by-passing the said device responsive to the body temperature of the occupant.

6. A control system according to claim 5 in which the switch means is associated with the adjustable device and operated thereby to by-pass the device responsive to the temperature of the occupant when the adjustable device is adjusted to a point below the upper end of its temperature range.

7. In an incubator having an air circulation system and a heater for heating the air in the incubator, a control system for the heater comprising a limiting thermostat for controlling the heater, the limiting thermostat being exposed to the air in the circulation system of the incubator and being responsive to the air temperature to establish an air temperature limit above which the heater does not operate to heat the air in the incubator, a control device responsive to the temperature of the occupant for controlling the heater, another device for controlling the heater exposed to the air in the circulation system and being responsive to the air temperature to establish, under normal operating conditions, a normal air temperature in the incubator below the air temperature limit established by the limiting thermostat, and a heater control circuit connecting the limiting thermostat in series with each of said devices.

8. A control system according to claim 7 and further including means operable at will for by-passing the device responsive to the temperature of the occupant.

9. A control system according to claim 7 in which said second device is adjustable through an air temperature control range lying below the limit established by the limiting thermostat, the system further including means operable at will for by-passing the device responsive to the temperature of the occupant and for connecting the limiting thermostat and the adjustable thermostat in series in the heater control circuit.

10. In an incubator having an air circulation system and a heater for heating the air in the incubator, a control system for the heater comprising three temperature responsive devices for regulating the heating action of the heater, two of said devices being exposed to the air in the air circulation system and being responsive to the temperature of the air in the air circulation system and respectively acting to cycle the operation of the heater in accordance with fluctuations of the temperature of the air in the incubator above and below two predetermined temperatures, and the third of said devices being responsive to the temperature of the occupant in the incubator and acting to cycle the operation of the heater in accordance with fluctuations of the temperature of the occupant above and below a third predetermined temperature intermediate the first two predetermined temperatures referred to.

11. A control system for the heater for heating the air in an incubator, comprising a first heater regulating device responsive to the temperature of the air in the incubator and acting to cycle the operation of the heater in accordance with fluctuations in temperature of the air in the incubator above and below a first predetermined temperature, a second heater regulating device responsive to the temperature of the occupant of the incubator and acting to cycle the operation of the heater in accordance with fluctuations of the temperature of the occupant above and below a second predetermined temperature above said first predetermined temperature, and a signal device responsive to the temperature of the air in the incubator and acting to give a warning signal when the air temperature in the incubator rises a predetermined amount above said second predetermined temperature.

12. In the operation of an infant incubator having an air heater, the method which comprises warming up an infant placed in the incubator by sensing the temperature of the air in the incubator and by cycling the operation of the heater in accordance with the sensed fluctuations of the air temperature above and below a first predetermined temperature until the infant's temperature rises to a second predetermined temperature above said first predetermined temperature, and thereafter maintaining the infant's temperature by sensing the fluctuations of the infant's temperature and by cycling the heater in accordance with the sensed fluctuations of the infant's temperature above and below said second predetermined temperature.

References Cited

UNITED STATES PATENTS

| | | | |
|---|---|---|---|
| 2,098,316 | 11/1937 | Sittler | 128—373 |
| 2,243,999 | 6/1941 | Chapple. | |
| 2,980,106 | 4/1961 | Carlson. | |
| 3,051,180 | 8/1962 | Adams-Ray et al. | 128—402 X |
| 3,274,994 | 9/1966 | Sturm | 128—2 |

RICHARD A. GAUDET, *Primary Examiner.*

W. E. KAMM, *Assistant Examiner.*